US008376763B1

(12) United States Patent
Hsu et al.

(10) Patent No.: US 8,376,763 B1
(45) Date of Patent: Feb. 19, 2013

(54) CARD CONNECTOR

(75) Inventors: Ya-Hui Hsu, Taoyuan County (TW);
Te-Hung Yin, Taoyuan County (TW)

(73) Assignee: Proconn Technology Co., Ltd., Taoyuan Country (TW)

( * ) Notice: Subject to any disclaimer, the term of this patent is extended or adjusted under 35 U.S.C. 154(b) by 0 days.

(21) Appl. No.: 13/296,627

(22) Filed: Nov. 15, 2011

(51) Int. Cl.
*H01R 13/62* (2006.01)

(52) U.S. Cl. ........................................ 439/155; 439/157

(58) Field of Classification Search ................ 439/155, 439/188, 326, 159, 157, 489
See application file for complete search history.

(56) References Cited

U.S. PATENT DOCUMENTS

| | | | |
|---|---|---|---|
| 6,544,074 B2 * | 4/2003 | Bricaud et al. ................ | 439/630 |
| 6,568,960 B2 * | 5/2003 | Bricaud et al. ................ | 439/630 |
| 7,435,116 B2 * | 10/2008 | Wang ............................ | 439/188 |
| 7,726,991 B2 * | 6/2010 | Ma et al. ....................... | 439/188 |

* cited by examiner

*Primary Examiner* — Tulsidas C Patel
*Assistant Examiner* — Phuongchi Nguyen
(74) *Attorney, Agent, or Firm* — WPAT, P.C.; Anthony King

(57) ABSTRACT

A card connector includes an insulating housing, a plurality of terminals, an ejection mechanism, a locking element and a shielding shell. The terminals are received in the insulating housing. The ejection mechanism is assembled in the insulating housing, and includes a sliding block, an elastic element and a guide pin. The sliding block includes a base block. A rear of the one side of the base block defines an inserting slot. The locking element has an inserting piece inserted into the inserting slot to make the locking element slide along with the sliding block, an elastic portion extending forward from one end of the inserting piece to be slidably disposed in the insulating housing, and a locking portion arced upward from a free end of the elastic portion to project beyond the top of the insulating housing. The shielding shell is covered on the insulating housing.

6 Claims, 5 Drawing Sheets

CARD CONNECTOR

BACKGROUND OF THE INVENTION

1. Field of the Invention

The present invention generally relates to a card connector, and more particularly to a card connector capable of ejecting an electronic card out of the card connector effectively.

2. The Related Art

With rapid development of digital technology, a variety of digital electronic products such as digital cameras and cell phones, have been widely used in our daily life. In order to expand the memory space and promote the performance of the digital electronic products, the digital electronic products always dispose electronic cards therein. So, various card connectors are widely used in the digital electronic products for receiving the electronic cards therein to realize an electrical connection and an information transmission between the corresponding digital electronic product and the electronic card.

In general, the card connector includes an insulating housing, a plurality of terminals assembled in the insulating housing, an ejection mechanism and a shielding shell covering on the insulating housing. The ejection mechanism adapted for ejecting the electronic card out of the card connector includes a sliding block, an elastic element and a guiding element. The insulating housing defines a receiving trough for receiving the sliding block therein. The sliding block defines a heart-shaped groove. The elastic element is clamped between the sliding block and an inner side of the receiving trough. One end of the guiding element is fastened to the insulating housing, and the other end of the guiding element is slidably located in the heart-shaped groove. However, when the electronic card is ejected out of the card connector, the electronic card is apt to be shot up on account of an excessively big elasticity of the elastic element that often brings inconvenience for a user.

SUMMARY OF THE INVENTION

An object of the present invention is to provide a card connector adapted for receiving an electronic card therein includes an insulating housing, a plurality of terminals, an ejection mechanism, a locking element and a shielding shell. The insulating housing has a base body. Two opposite sides of the base body extend upward to form two side walls. The base body defines a plurality of terminal grooves of which each penetrates through a top of the base body. One side of a top of the base body is concaved downward to form a receiving trough adjacent to one side wall. A locking groove is opened downward in the top of the base body and connected with an inner side of the receiving trough opposite to the one side wall. A top of the one side wall defines a passage of which a front end passes sideward through the one side wall to communicate with a front end of the receiving trough. The terminals are received in the terminal grooves of the insulating housing with top portions thereof being exposed to the top of the base body to electrically contact with the electronic card. The ejection mechanism includes a sliding block slidably disposed in the receiving trough of the insulating housing, an elastic element received in the passage and clipped between the sliding block and a rear inner end surface of the passage, and a guide pin of which one end is fastened in a front of the insulating housing and the other end is slidably located in the sliding block. The sliding block has a base block, and a pushing block extending horizontally from a top of one side of the base block to stretch above the top of the base body for ejecting the electronic card out. A rear of the one side of the base block defines an inserting slot. The locking element has an inserting piece inserted into the inserting slot to make the locking element slide along with the sliding block, an elastic portion extending forward from one end of the inserting piece to be slidably disposed in the locking groove, and a locking portion arced upward from a free end of the elastic portion to project beyond the top of the base body so as to elastically resist against a bottom of the electronic card. The shielding shell is covered on the insulating housing to define an insertion space between the top of the base body and a bottom of the shielding shell for receiving the electronic card therein.

As described above, the electronic card is clipped between the locking portion of the locking element and the bottom of the shielding shell to make the electronic card ejected outward steadily under the pushing force of the pushing block. Furthermore, the locking element slides along with the sliding block of the ejection mechanism, and the locking portion of the locking element rubs against the electronic card to make the electronic card ejected outward slowly. As a result, the electronic card is ejected out of the card connector effectively to ensure a successful usage for a user.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
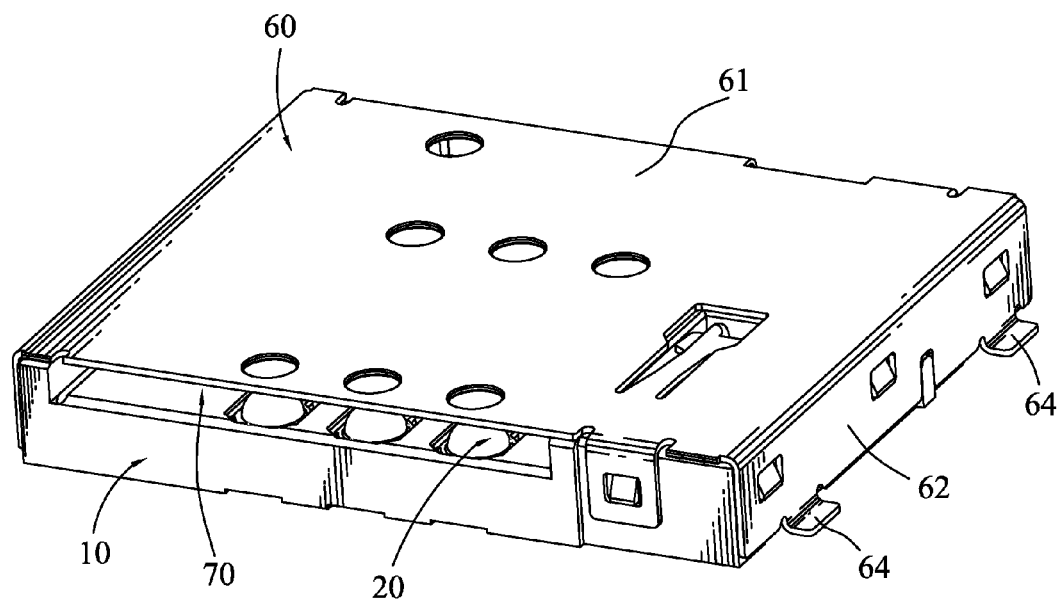
FIG. 1 is a perspective view of a card connector in accordance to the present invention.
Figure 2:
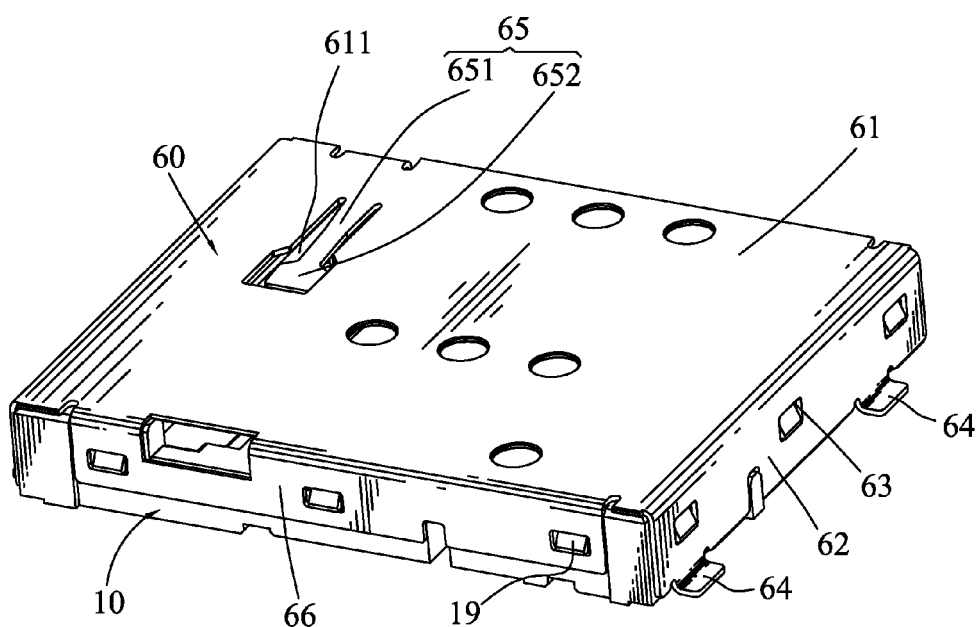
FIG. 2 is another perspective view of the card connector of FIG. 1.
Figure 3:
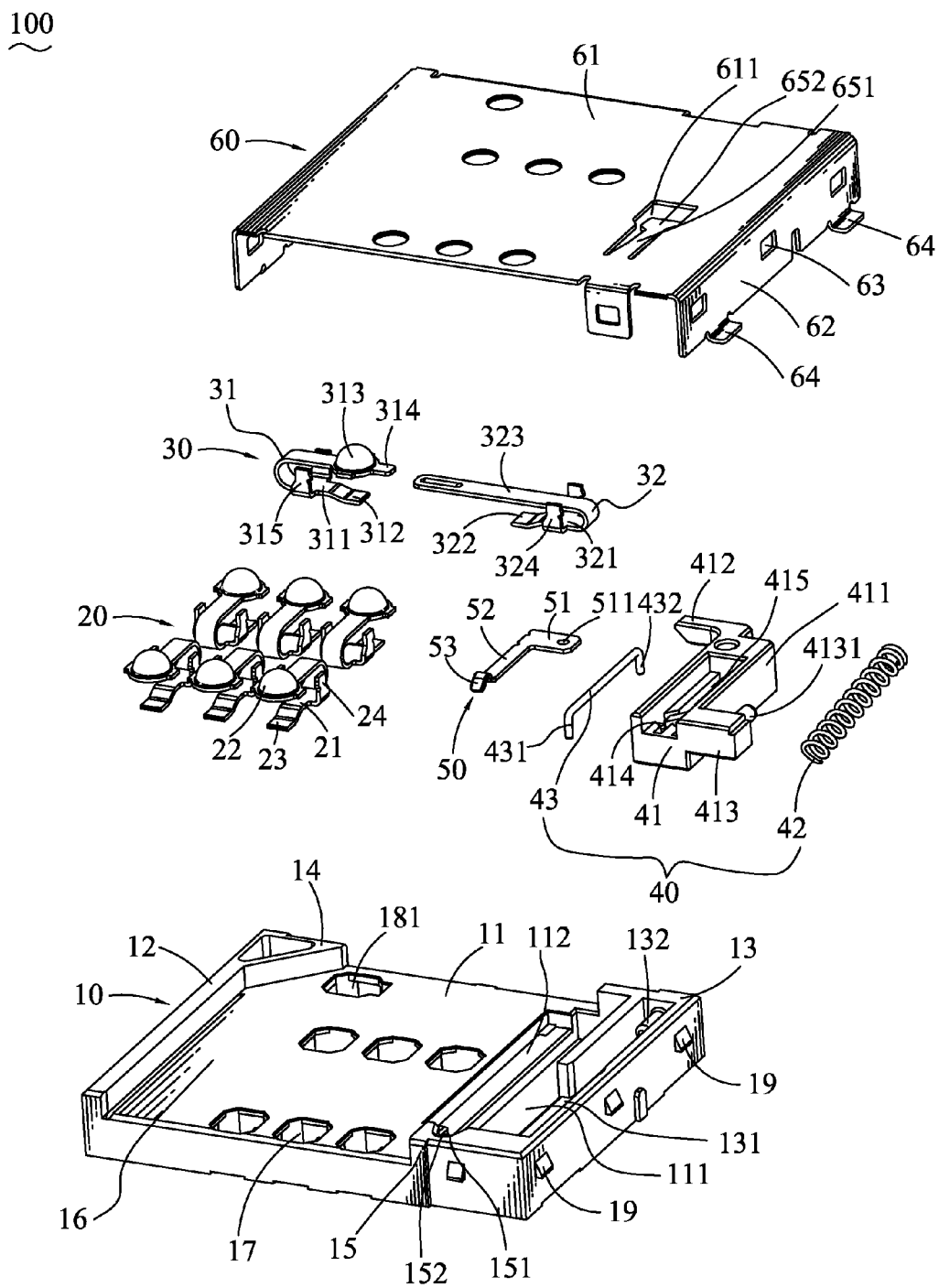
FIG. 3 is an exploded view of the card connector of FIG. 1.

With reference to FIG. 1, FIG. 2 and FIG. 3, a card connector 100 in accordance with the present invention is shown. The card connector 100 adapted for receiving an electronic card (not shown) therein includes an insulating housing 10, a plurality of terminals 20, a switch terminal assembly 30, an ejection mechanism 40, a locking element 50 and a shielding shell 60.

Referring to FIG. 1 and FIG. 3, the insulating housing 10 has a base body 11 of a rectangular shape. Two opposite sides of the base body 11 extend upward to define a first side wall 12 and a second side wall 13. A pair of rear walls 14 are extended upward from two portions of a rear end of the base body 11 and connected with the first side wall 12 and the second side wall 13, respectively. A front wall 15 is extended upward from a front end of the base body 11 and connected with the second side wall 13. A receiving space 16 is formed among a top of the base body 11, the first side wall 12, the second side wall 13, the rear walls 14 and the front wall 15. The base body 11 defines two rows of terminal grooves 17 located at the front end of the base body 11 and a substantial middle of the base body 11. Each row of the terminal grooves 17 are arranged at regular intervals along a transverse direction of the insulating housing 10.

Figure 4:
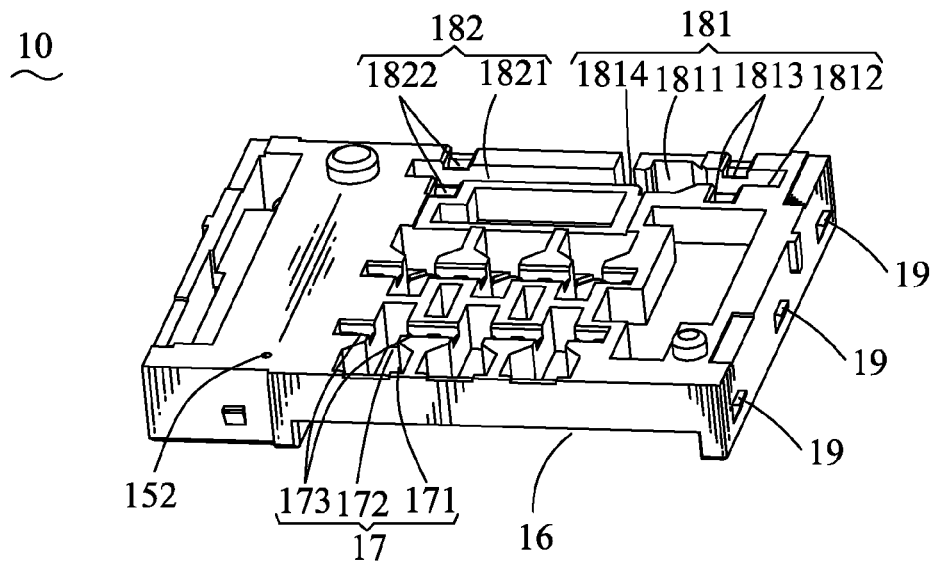
FIG. 4 is a perspective view of an insulating housing of the card connector of FIG. 3.
Figure 5:
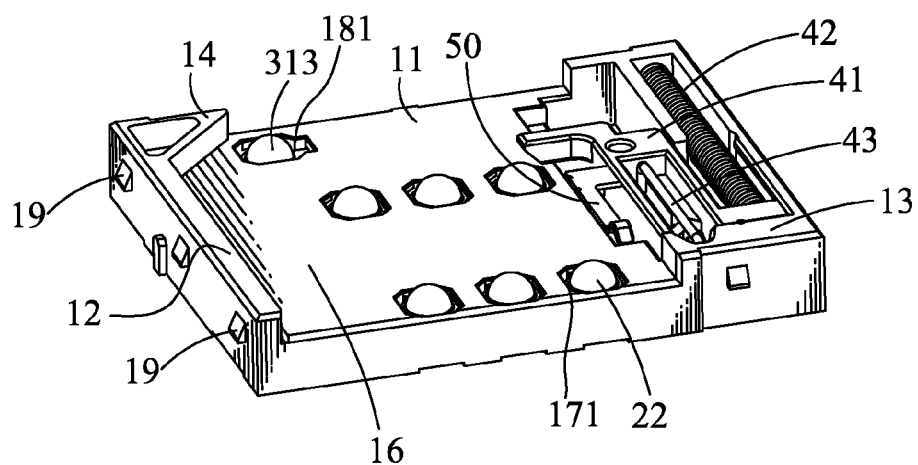
FIG. 5 is a perspective view of the card connector of FIG. 1, but without a shielding shell being covered on the insulating housing of the card connector.

Referring to FIG. 3 and FIG. 4, each terminal groove 17 includes a locating groove 171 extending vertically to penetrate through the base body 11, a fastening groove 172 extending inward from an inner end of a bottom of the fastening groove 172, and a pair of fastening slots 173 opened at two bottoms of two opposite sidewalls of the fastening groove 172. The rear end of the base body 11 transversely defines a first switch terminal groove 181 and a second switch terminal groove 182. The first switch terminal groove 181 includes a first receiving groove 1811 extending vertically to penetrate through the base body 11, a first fixing groove 1812 extending outward from an outer end of a bottom of the first receiving groove 1811, a pair of first fixing slots 1813 opened at two bottoms of two opposite sidewalls of the first fixing groove 1812, and a connecting groove 1814 with one side thereof connected with a middle of an inner end of the bottom of the first receiving groove 1811. The second switch terminal groove 182 includes a second fixing groove 1821 extending transversely along a bottom of the rear end of the base body 11 and connected with the other side of the connecting groove 1814, and a pair of second fixing slots 1822 opened at two bottoms of two opposite sidewalls of the second fixing groove 1821.

One side of the top of the base body 11 adjacent to the second side wall 13 is concaved downward to form a receiving trough 111. A locking groove 112 is opened downward in the top of the base body 11 and connected with a middle of an inner side of a top of the receiving trough 111 opposite to the second side wall 13. A top of the second side wall 13 is concaved downward to form a passage 131 of which a front end passes sideward through the second side wall 13 to communicate with a front end of the receiving trough 111. A first pillar 132 is protruded forward from a rear inner end surface of the passage 131. A top of the front wall 15 is concaved downward to form a notch 151. A bottom wall of the notch 151 defines an insertion hole 152 vertically penetrating therethrough. A plurality of buckling lumps 19 are protruded outward from an outer periphery of the insulating housing 10.

Referring to FIG. 3, each of the terminals 20 has a lying U-shaped fastening portion 21. One free end of the fastening portion 21 at a top thereof is spread outward and then arced upward to form a semicircle contact portion 22. The other free end of the fastening portion 21 at a bottom thereof is inclined downward and then extends horizontally to form a soldering portion 23. Two opposite sides of the bottom of the fastening portion 21 are bent upward form two fastening arms 24.

Referring to FIG. 3, the switch terminal assembly 30 includes a first switch terminal 31 and a second switch terminal 32. The first switch terminal 31 has a lying U-shaped first fixing portion 311. A lower free end of the first fixing portion 311 is inclined downward and then extends horizontally to form a first soldering foot 312. An upper free end of the first fixing portion 311 is designed with a touching portion 313 of a hollow hemispherical shape. A free end of the touching portion 313 opposite to the first fixing portion 311 further extends horizontally to form a first connecting portion 314. Two opposite sides of the bottom of the first fixing portion 311 are bent upward to form two first fixing arms 315. The second switch terminal 32 has a second fixing portion 321. One end of the second fixing portion 321 is inclined downward and then extends horizontally to form a second soldering foot 322. The other end of the second fixing portion 321 is curved upward, and then extends horizontally to form a second connecting portion 323. Two opposite sides of the second fixing portion 321 are bent upward to form two second fixing arms 324.

Figure 6:
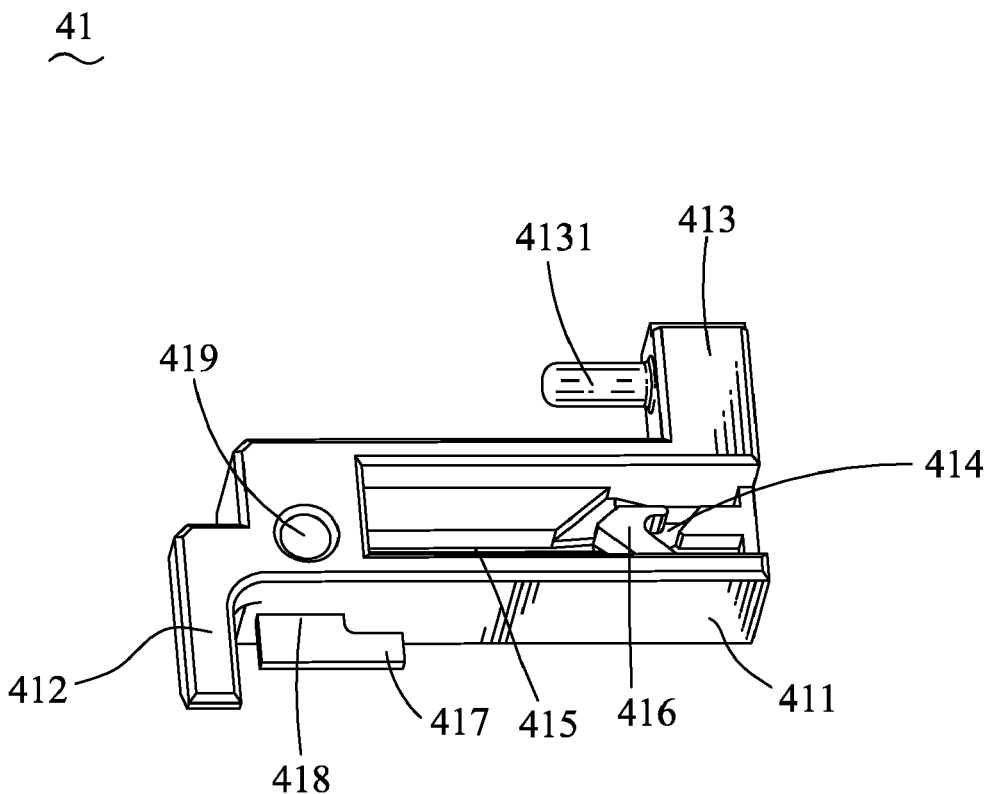
FIG. 6 is a perspective view of a sliding block of the card connector of FIG. 3.

Referring to FIG. 3 and FIG. 6, the ejection mechanism 40 has a sliding block 41, an elastic element 42 and a guide pin 43 of an inverted-U shape which includes a fastening portion 431 and a sliding portion 432. The sliding block 41 includes a base block 411, a pushing block 412 extending rearward, and then bent sideward from a side of a top of a rear surface of the base block 411, and a locating block 413 extending horizontally from a front of a top of one side of the base block 411. A second pillar 4131 is protruded rearward from a rear surface of the locating block 413. A top of the base block 411 defines a heart-shaped tracking groove 414 joined end to end, and a tracking slot 415 extending longitudinally and connected with a rear portion of the tracking groove 414. A heart-shaped resisting portion 416 is formed in the tracking groove 414 and located apart from a periphery inside of the tracking groove 414. A rear of the other side of the base block 411 extends horizontally to form a supporting board 417. The base block 411 defines a fastening hole 419 vertically penetrating therethrough, and an inserting slot 418 located adjacent to a top of the supporting board 417, and extending longitudinally to communicate with the fastening hole 419.

Referring to FIG. 3, the locking element 50 has an inserting piece 51 with an inserting hole 511 being formed therein. One end of a front of the inserting piece 51 extends forward to form an elastic portion 52. A free end of the elastic portion 52 is arced upward to form a locking portion 53.

Referring to FIG. 2 and FIG. 3, the shielding shell 60 has a base plate 61 of a rectangular shape. Two opposite sides of the base plate 61 are bent downward to form two side plates 62. A rear end of the base plate 61 is bent downward to form a rear plate 66. One side of the top plate 61 defines an opening 611 at a front portion thereof. A pressing tab 65 is defined in the opening 611 and has an elastic arm 651 extending rearward and inclined downward from a front edge of the opening 611, and a pressing piece 652 extended outward and then rearward from a free end of the elastic arm 651. A plurality of clipping grooves 63 are distributed in the side plates 62 and the rear plate 66. Two portions of two bottoms of the two side plates 62 are bent outward to form two soldering plates 64.

Referring to FIGS. 1-6, when the card connector 100 is assembled, the terminals 20 are received in the terminal grooves 17 of the insulating housing 10 with the fastening portions 21 fastened in the fastening grooves 172, the fastening arms 24 fastened in the fastening slots 173, the contact portions 22 exposed to the top of the base body 11 of the insulating housing 10 from the locating groove 171, and the soldering portions 23 projecting under the base body 11. The first switch terminal 31 is assembled in the first switch terminal groove 181 with the first fixing portion 311 fixed in the first fixing groove 1812, the two first fixing arms 315 fixed in the first fixing slots 1813, the touching portion 313 exposed to the top of the base body 11 from the first receiving groove 1811 with the mouth thereof facing the first soldering foot 312, the first soldering foot 312 projecting under the base body 11, and the first connecting portion 314 located in the connecting groove 1814. The second switch terminal 32 is assembled in the second switch terminal groove 182. The second connecting portion 323 is fixed in a top of the second fixing groove 1821 with a free end thereof being located apart under the first connecting portion 314 and spaced a small interval from the first connecting portion 314, and the second fixing portion 321 is fixed in a bottom of the second fixing groove 1821. The two second fixing arms 324 is fixed into the two second fixing slots 1822, and the second soldering foot 322 projects under the base body 11.

The inserting piece 51 of the locking element 50 is inserted into the inserting slot 418 of the sliding block 41, and the one end of the inserting piece 51 and a rear of the elastic portion 52 is propped up by the supporting board 417. The inserting hole 511 of the locking element 50 is aligned with the fastening hole 419 of the sliding block 41. The locking element 50 is fastened to the sliding block 41 by means of using a fastening element (not shown) to pass through the inserting hole 511 and the fastening hole 419. Then the ejection mechanism 40 is assembled in the insulating housing 10. The base block 411 is slidably disposed in the receiving trough 111. The pushing block 412 is located in the receiving space 16. The locating block 413 is projected into the passage 131, and the second pillar 4131 is located in the passage 131. The elastic element 42 is received in the passage 131 with one end thereof worn around the first pillar 132 and against the rear inner end surface of the passage 131, and the other end thereof worn around the second pillar 4131 and against the rear surface of the locating block 413. The fastening portion 431 of the guide pin 43 is fastened in the insertion hole 152 and the sliding portion 432 is located in the tracking slot 415. The one end of the inserting piece 51 and the rear of the elastic portion 52 together with the supporting board 417 are slidably disposed in the locking groove 112. The locking portion 53 of the locking element 50 projects beyond the top of the base body 11. The shielding shell 60 is covered on the insulating housing 10 with the base plate 61 spaced from the top of the base body 11 to define an insertion space 70 between a bottom of the base plate 61 and the top of the base body 11. The pressing piece 652 of the pressing tab 65 resists on the guide pin 43 for restraining the guide pin 43 to steadily slide in the tracking groove 414 and the tracking slot 415 of the sliding block 41. The buckling lumps 19 are buckled in the clipping grooves 63. The soldering portions 23, the first soldering foot 312, the second soldering foot 322 and the soldering plates 64 are soldered on a printed circuit board (not shown). The rear plate 66 of the shielding shell 60 blocks a rear of the insertion space 70 for preventing the electronic card from wrongly inserting into the insertion space 70.

When the electronic card is inserted into a front of the insertion space 70, the electronic card pushes the pushing block 412 of the sliding block 41 rearward to drive the base block 411 together with the locking element 50 located on the supporting board 417 to slide rearward along the receiving trough 111 and the locking groove 112 to compress the elastic element 42, and the locking portion 53 is elastically resist against a bottom of the electronic card to make the electronic card clipped between the locking portion 53 and the base plate 61. The pressing piece 652 of the pressing tab 65 resists on the guide pin 43 and exerts a horizontal force on the guide pin 43 to make the sliding portion 432 of the guide pin 43 steadily slide in the tracking groove 414 until the sliding portion 432 is locked in the resisting portion 416. At this moment, the card is fully received in the receiving space 70 of the card connector 100. The contact portions 22 of the terminals 20 contact with conductive pieces (not shown) of the electronic card to realize an electrical connection between the card connector 100 and the electronic card. The touching portion 313 of the first switch terminal 31 is pressed downward by the electronic card to drive the first connecting portion 314 to electrically contact with the free end of the second connecting portion 323 of the second switch terminal 32 so as to realize a switch function of the switch terminal assembly 30.

When the electronic card is to be ejected from the card connector 100, push the electronic card rearward again to make the sliding portion 432 of the guide pin 43 to re-slip into the tracking slot 415 through the tracking groove 414. Then the elastic element 42 is released to push the locating block 413 forward and drive the sliding block 41 together with the locking element 50 to slide forward simultaneously to make the electronic card ejected outward by virtue of pushing force of the pushing block 412. On one hand, the electronic card is clipped between the locking portion 53 and the base plate 61 to make the electronic card ejected outward steadily. On the other hand, the electronic card is ejected outward slowly on account of the locking portion 53 rubbing against the electronic card. Then pull the electronic card forward to draw the electronic card out of the card connector 100 effectively.

As described above, the electronic card is clipped between the locking portion 53 of the locking element 50 and the base plate 61 of the shielding shell 60 to make the electronic card ejected outward steadily under the pushing force of the pushing block 412. Furthermore, the locking element 50 slides along with the sliding block 41 of the ejection mechanism 40, and the locking portion 53 of the locking element 50 rubs against the electronic card to make the electronic card ejected outward slowly. As a result, the electronic card is ejected out of the card connector 100 effectively to ensure a successful usage for a user.

What is claimed is:
1. A card connector adapted for receiving an electronic card therein, comprising:
an insulating housing having a base body, two opposite sides of the base body extending upward to form two side walls, the base body defining a plurality of terminal grooves of which each penetrates through a top of the base body, one side of the top of the base body being concaved downward to form a receiving trough adjacent to one side wall, a locking groove being opened downward in the top of the base body and connected with an inner side of the receiving trough opposite to the one side wall, a top of the one side wall defining a passage of which a front end passes sideward through the one side wall to communicate with a front end of the receiving trough;
a plurality of terminals received in the terminal grooves of the insulating housing with top portions thereof being exposed to the top of the base body to electrically contact with the electronic card;
an ejection mechanism including a sliding block slidably disposed in the receiving trough of the insulating housing, an elastic element received in the passage and clipped between the sliding block and a rear inner end surface of the passage, and a guide pin of which one end is fastened in a front of the insulating housing and the other end is slidably located in the sliding block, the sliding block having a base block, a pushing block extending horizontally from a top of one side of the base block to stretch above the top of the base body for ejecting the electronic card out, a rear of the one side of the base block defining an inserting slot;
a locking element having an inserting piece inserted into the inserting slot to make the locking element slide along with the sliding block, an elastic portion extending forward from one end of the inserting piece to be slidably disposed in the locking groove, and a locking portion arced upward from a free end of the elastic portion to project beyond the top of the base body so as to elastically resist against a bottom of the electronic card; and
a shielding shell covered on the insulating housing to define an insertion space between the top of the base body and a bottom of the shielding shell for receiving the electronic card therein.

2. The card connector as claimed in claim 1, wherein the sliding block further has a locating block extending horizontally from a front of the other side of the base block and projected into the passage, a second pillar is protruded rearward from a rear surface of the locating block and located in the passage, a first pillar is protruded forward from the rear inner end surface of the passage, the elastic element is received in the passage with one end thereof being worn around the first pillar and against the rear inner end surface of the passage, and the other end thereof being worn around the second pillar and against the rear surface of the locating block.

3. The card connector as claimed in claim 1, wherein a rear end of the shielding shell extends downward to form a rear plate blocking a rear of the insertion space.

4. The card connector as claimed in claim 1, further comprising a first switch terminal and a second switch terminal transversely disposed in a rear end of the base body, the first switch terminal having a lying U-shaped first fixing portion of which a lower free end is inclined downward and then extends horizontally to form a first soldering foot projecting under the base body, and an upper free end is designed with a touching portion of a hollow hemispherical shape projecting beyond the top of the base body with the mouth thereof facing the soldering foot, a free end of the touching portion further extending horizontally to form a first connecting portion, the second switch terminal having a second fixing portion of which one end is inclined downward and then extends horizontally to form a second soldering foot projecting under the base body, the other end of the second fixing portion being curved upward and then extending horizontally to form a second connecting portion of which a free end is located apart under the first connecting portion, the free end of the second connecting portion electrically connects with the first connecting portion when the touching portion is pressed downward by the electronic card.

5. The card connector as claimed in claim 1, wherein the rear of the one side of the base block of the sliding block extends horizontally to form a supporting board located under the inserting slot and projected into the locking groove to prop up the one end of the inserting piece and a rear of the elastic portion of the locking element.

6. The card connector as claimed in claim 5, wherein the base block of the sliding block defines a fastening hole vertically penetrating therethrough and communicating with the inserting slot, the inserting piece of the locking element defines an inserting hole aligned with the fastening hole, the locking element is fastened to the base block by means of using a fastening element to pass through the inserting hole and the fastening hole.

* * * * *